C. F. HILL.

Shoes.

No. 6,281. Reissued Feb. 9, 1875.

WITNESSES:

W. W. Hollingsworth

Geo. C. Kenon

INVENTOR:

Chas. F. Hill

BY

ATTORNEYS.

UNITED STATES PATENT OFFICE

CHARLES F. HILL, OF BALTIMORE, MARYLAND, ASSIGNOR TO HIMSELF AND GEORGE D. HILL, OF SAME PLACE.

IMPROVEMENT IN SHOES.

Specification forming part of Letters Patent No. 158,275, dated December 29, 1874; reissue No. 6,281, dated February 9, 1875; application filed January 29, 1875.

*To all whom it may concern:*

Be it known that I, CHARLES F. HILL, of Baltimore city, State of Maryland, have invented a new and useful Improvement in Shoes; and I do hereby declare that the following is a full, clear, and exact description of the same, reference being had to the accompanying drawing, forming a part of this specification, in which—

Figure 1:
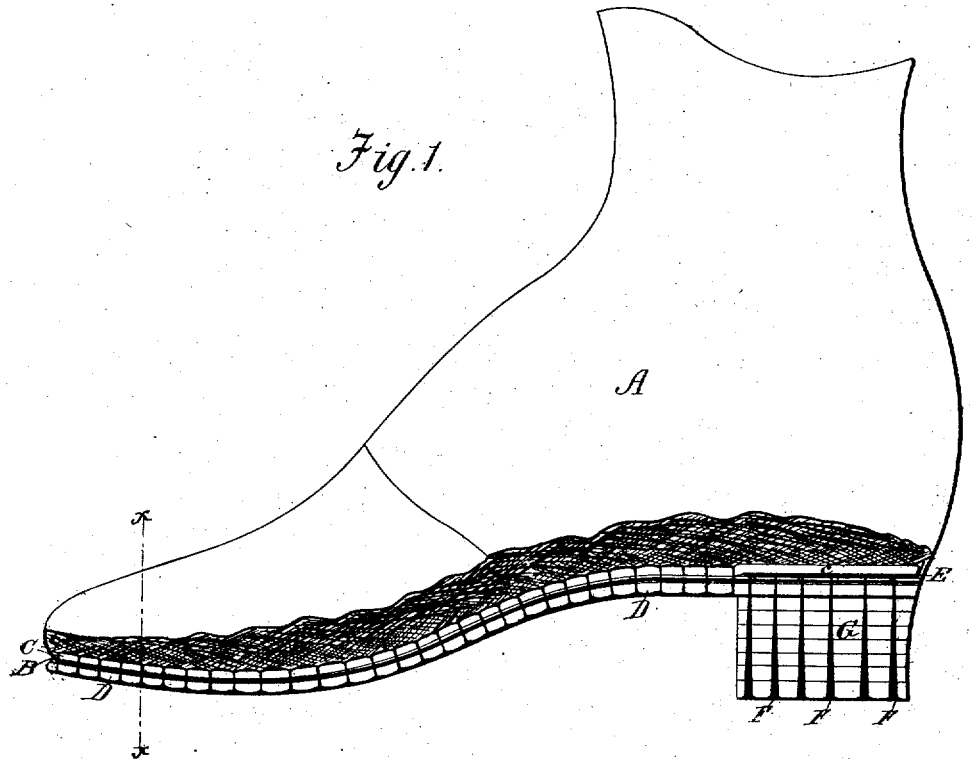
Figure 2:
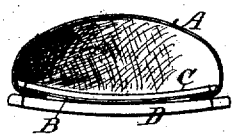
Figure 3:
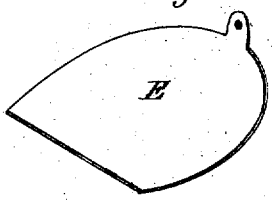

Figure 1 is a side elevation, partly in section; Fig. 2, a section of Fig. 1 through line *x x;* Fig. 3, detail of the removable metallic heel-plate.

This invention relates to certain improvements in the manufacture of shoes. It consists in a shoe in which a middle sole, which receives the lasting-nails, is covered by an insole, and the whole united by a line of stitching passing through the outer sole, the upper, middle, and insoles, whereby the shoe is made stronger and more substantial, and the customary annoyance of protruding tacks upon the insole of the shoe entirely avoided. It also consists in an improved mode of clinching the heel-nails in the lasting-sole by a removable metallic plate interposed between the lasting-sole and the loose heel part of the stitched insole.

In the drawing, A represents the upper of the shoe, which is tacked, as usual, over a middle sole, B D is the outer sole, which, with the tacked middle sole, clamps the edge of the upper. C is an insole, which is placed upon the lasting-sole B, and sewed to the same, and to the outer sole, through and through, all the way around, as far as the heel, but no farther, the heel part of this stitched insole being left loose for the insertion of a detachable metallic plate, E. Said plate is employed for the purpose of clinching the nails which fasten the heel to the lasted sole B, and for this purpose is inserted beneath the loose part *c* of the stitched sole C, so that when the last is placed within the shoe, and the heel-pieces G are to be fastened thereto, the tacks F strike the metallic plate and clinch the lasting-sole, leaving the part *c*, which forms the support for the heel, perfectly plain and comfortable. Said loose piece *c* is slitted and undercut at the terminus of the line of stitching, so that if the stitching is continued too far, the thread passing through the slit does not fasten too much of the loose part *c* to the lasting-sole, to admit of the insertion of the metallic plate.

In the shoes of ordinary manufacture the nails of the lasting-sole are only covered by a strip of thin material, which soon wears out and leaves the exposed tacks to soil the stocking and disturb the comfort of the wearer.

My invention obviates this difficulty, and, while being upon the whole a stronger and more substantial shoe, also admits of the utilization of an inferior quality of leather for the lasting-sole.

Having thus described my invention, what I claim as new is—

1. A shoe in which a middle sole receiving the lasting-nails is covered by an insole, and the whole united by a line of stitching passing through the outer sole, the upper, the middle, and the insole, substantially as and for the purpose described.

2. The herein-described mode of clinching the heel-nails in the lasting-sole by a removable metallic plate interposed between the lasting-sole and the loose heel part of the stitched insole, substantially as and for the purpose described.

CHARLES F. HILL.

Witnesses:

G. E. SANGSTER,

WM. D. ELDRIDGE.